(12) United States Patent
Solomon et al.

(10) Patent No.: US 8,451,808 B2
(45) Date of Patent: May 28, 2013

(54) TECHNIQUES FOR 40 MEGAHERTZ (MHZ) CHANNEL SWITCHING

(75) Inventors: Trainin Solomon, Haifa (IL); Adrian Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 11/647,018

(22) Filed: Dec. 27, 2006

(65) Prior Publication Data

US 2007/0195744 A1    Aug. 23, 2007

Related U.S. Application Data

(60) Provisional application No. 60/775,135, filed on Feb. 18, 2006.

(51) Int. Cl.
*H04W 4/00* (2009.01)
(52) U.S. Cl.
USPC ........... 370/338; 370/328; 370/329; 370/341; 370/431
(58) Field of Classification Search
None
See application file for complete search history.

(56) References Cited

U.S. PATENT DOCUMENTS

| | | | | |
|---|---|---|---|---|
| 2002/0188723 | A1* | 12/2002 | Choi et al. | 709/225 |
| 2003/0002456 | A1* | 1/2003 | Soomro et al. | 370/328 |
| 2003/0112758 | A1* | 6/2003 | Pang et al. | 370/235 |
| 2004/0179549 | A1* | 9/2004 | Ophir et al. | 370/474 |
| 2005/0288015 | A1 | 12/2005 | Azizi et al. | |
| 2006/0013184 | A1 | 1/2006 | Utsunomiya et al. | |
| 2006/0029023 | A1 | 2/2006 | Cervello et al. | |
| 2006/0146869 | A1* | 7/2006 | Zhang et al. | 370/465 |
| 2006/0291432 | A1* | 12/2006 | Xhafa et al. | 370/336 |
| 2007/0204052 | A1 | 8/2007 | Trainin et al. | |
| 2008/0013496 | A1* | 1/2008 | Dalmases et al. | 370/336 |
| 2010/0272058 | A1 | 10/2010 | Solomon et al. | |

FOREIGN PATENT DOCUMENTS

| | | |
|---|---|---|
| CN | 101371514 B | 5/2012 |
| JP | 2001509514 A | 3/2004 |
| JP | 2009521896 A | 6/2009 |
| WO | 0223819 | 3/2002 |
| WO | 0223819 A2 | 3/2002 |
| WO | 2005122501 A1 | 12/2005 |
| WO | WO 2005/122501 | 12/2005 |
| WO | 2007098218 | 8/2007 |
| WO | 2007098218 | 10/2007 |

OTHER PUBLICATIONS

"EWC: HT MAC Specification", *Enhanced Wireless Consortium*, (2005),100 pgs.

Office Action received for Japanese Patent Application No. P2008-548888, mailed on Mar. 22, 2011, 5 pgs. including 2 pgs. of English translation.

(Continued)

*Primary Examiner* — Nimesh Patel
*Assistant Examiner* — Daniel Nobile
(74) *Attorney, Agent, or Firm* — Kacvinsky Daisak PLLC

(57) ABSTRACT

Embodiments of the invention include methods, articles, and apparatuses to provide information related to channels transmitted and received according to a wireless communications protocol. One embodiment of the invention provides a method comprising generating channel offset information corresponding to an extension channel within a channel of a wireless communications protocol, and transmitting the channel offset information as part of channel information to be transmitted to one or more remote devices communicating according to the wireless communications protocol. Other embodiments are also disclosed.

15 Claims, 4 Drawing Sheets

OTHER PUBLICATIONS

Office Action received for Chinese Patent Application No. 200780002587.8, mailed on Sep. 14, 2010, 8 pgs. including 4 pgs. of English translation.

Office Action received for Chinese Patent Application No. 200780002587.8, mailed on Sep. 15, 2011, 12 pgs. including 6 pgs. of English translation.

Office Action received for Taiwan Patent Application No. 096105123, mailed on Aug. 14, 2010, 8 pgs. including 4 pgs. of English translation.

Office Action received for European Patent Application No. 07751309.1, mailed on Nov. 24, 2008, 3 pgs.

International Preliminary Report on Patentability and Written Opinion received for PCT Application No. PCT/US2007/004539, mailed on Aug. 28, 2008, 7 pgs.

International Preliminary Report on Patentability and Written Opinion received for PCT Application No. PCT/US2007/004539, mailed on Aug. 22, 2007, 10 pgs.

Office Action received for Japanese Patent Application No. P2008-548888, mailed on Mar. 5, 2012, 4 pgs. including 2 pgs. of English translation.

Office Action received for Japanese Patent Application No. 2008-548888, mailed Jul. 17, 2012, 4 pages including 2 pages English translation.

* cited by examiner

| Element ID 210 | Length 220 | New Extension Channel Offset 230 |

| Name | Type | Valid Range |
|---|---|---|
| Mode 310 | Integer | 0, 1 |
| Channel Number 320 | Integer | As Defined in Specification |
| New Extension Channel Offset 330 | Integer | 0, 1, 2 |
| Channel Switch Count 340 | Integer | 0-255 |

| Name | Type | Valid Range |
|---|---|---|
| Mode | Integer | 0, 1 |
| Channel Number | Integer | As Defined in Specification |
| New Extension Channel Offset | Integer | 0, 1, 2 |
| Channel Switch Count | Integer | 0-255 |

*FIG. 5*

TECHNIQUES FOR 40 MEGAHERTZ (MHZ) CHANNEL SWITCHING

CROSS-REFERENCE TO RELATED APPLICATION

This application claims the benefit of U.S. Provisional Patent Application No. 60/775,135 filed on Feb. 18, 2006.

TECHNICAL FIELD

Embodiments of the invention relate to wireless communications. More particularly, embodiments of the invention relate to wireless local area network (WLAN) communications utilizing 40 MHz channel switching including, for example, IEEE 802.11n based communications.

BACKGROUND

Current Institute of Electrical and Electronics Engineers (IEEE) 802.11b/g wireless local area network (WLAN) standards offer the convenience of wireless connections with adequate performance for many tasks. The IEEE 802.11b standard corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. The IEEE 802.11g standard corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003, as well as related documents. Related documents may include, for example, the IEEE 802.11a standard.

However, for some operations under current WLAN standards, such as streaming high quality multimedia content, throughput provided by these standards may not be adequate. In response to demand, IEEE approved the creation of the IEEE 802.11 Task Group N (TGn) to define modifications to the Physical Layer and Medium Access Control Layer (PHY/MAC) to deliver 100 megabit-per-second (Mbps) or greater throughput. The result is an upcoming specification referred to as 'IEEE 802.11n' that is an addition to the 802.11 family of standards that is intended to increase wireless network speed and reliability.

IEEE 802.11n communications are based on multiple input, multiple output (MIMO) technology that uses multiple antennae at both the transmitter and receiver sides of a communication link. The 802.11n standard may use orthogonal frequency-division multiplexing (OFDM) to increase speed, as well as techniques to transmit multiple redundant copies of data to increase reliability. With prior art standards, a 20 MHz channel bandwidth was utilized. However, MIMO approaches using only 20-MHz channel require higher implementation costs to meet the IEEE TGn requirement of 100 Mbps throughput. Meeting the IEEE TGn requirement with only 20-MHz channels would require at least three antenna analog front ends at both the transmitted and receiver. At the same time, a 20-MHz approach will struggle to provide a robust experience with applications that demand higher throughput in real user environments.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 2 illustrates one embodiment of a New Extension Channel Offset element;

FIG. 3 is a conceptual illustration of one embodiment of a channel switch request primitive;

FIG. 5 is a conceptual illustration of one embodiment of a channel switch response primitive.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the invention provide for 40 MHz channel switching in wireless local area network (WLAN) communications, such as in IEEE 802.11n based communications. In one embodiment, a 40 MHz channel may include both control and extension channels (each 20 MHz). To implement 40 MHz channel switching, described herein are an Extension Channel information element and a format for a Channel Switch Announcement frame.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and the like, although the scope of the invention is not limited in this respect.

Types of wireless communication systems intended to be within the scope of the present invention include, although not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like, although the scope of the invention is not limited in this respect.

Figure 1:
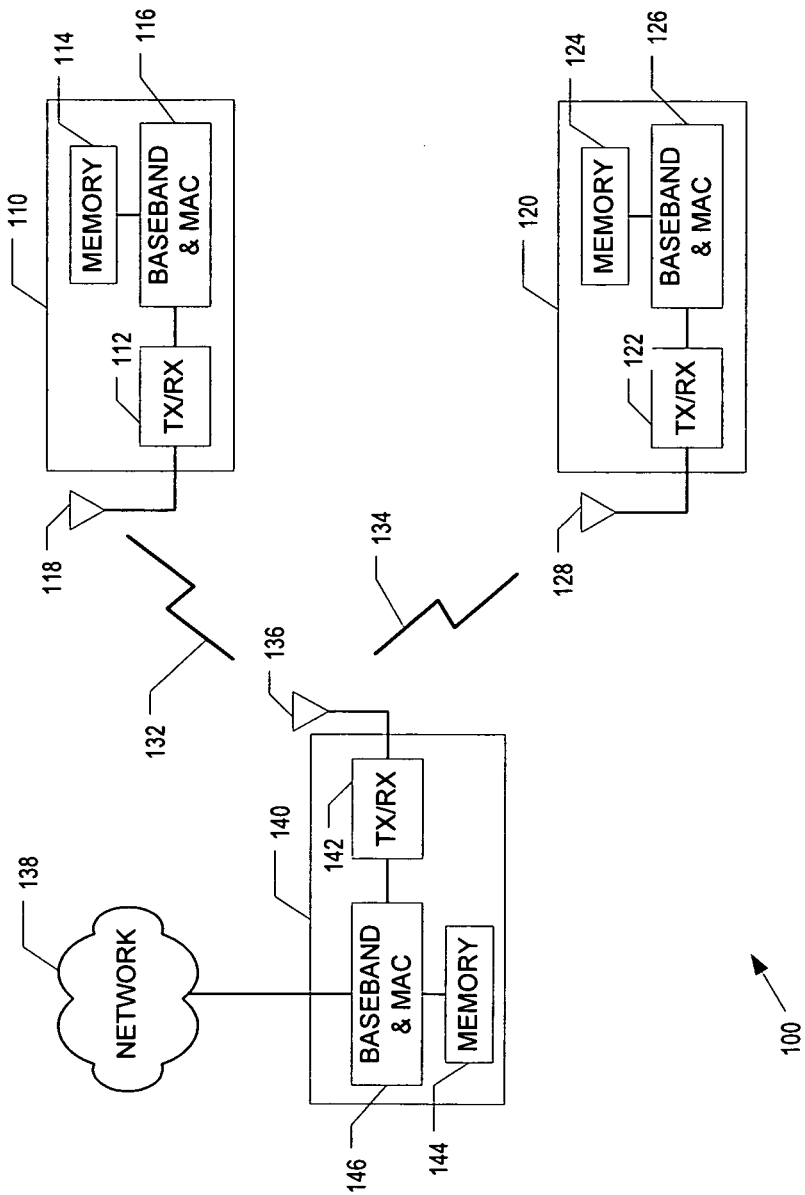
FIG. 1 illustrates a block diagram of one embodiment of a wireless local area network.

FIG. 1 illustrates a block diagram of one embodiment of a WLAN. In the wireless local area network (WLAN) system 100 shown in FIG. 1, a first device 110 may include a wireless transceiver 112 to couple to an antenna 118 and to a baseband processor 116. Baseband processor 116 in one embodiment may include a single processor, or alternatively may include a baseband processor and an applications processor, although the scope of the invention is not limited in this respect. Baseband processor 116 may couple to a memory 114 which may include volatile memory such as DRAM, non-volatile memory such as flash memory, or alternatively may include other types of storage such as a hard disk drive, although the scope of the invention is not limited in this respect. Some portion or all of memory 114 may be included on the same integrated circuit as baseband processor 116, or alternatively some portion or all of memory 114 may be disposed on an integrated circuit or other medium, for example a hard disk drive, that is external to the integrated circuit of baseband processor 116, although the scope of the invention is not limited in this respect. Likewise, a second device 120 may include a transceiver 122, memory 124, baseband processor 126, and antenna 128. Access point 140 may include a transceiver 142, memory 144, baseband processor 146 and antenna 136.

First device 110 and second device 120 may communicate with access point 140 via wireless communication links 132 and 134, respectively. Access point 140 may include at least one antenna 136. Alternatively, access point 140, and optionally first device 110 and second device 120, may include two or more antennas to provide a diversity antenna arrangement, to provide spatial division multiple access (SDMA), or to provide a multiple input, multiple output (MIMO) system, or the like, although the scope of the invention is not limited in this respect. Access point 140 may couple with network 138 so that first device 110 and second device 120 may communicate with network 138, including devices coupled to network 138, by communicating with access point 140 via wireless communication links 132 and 134. Network 138 may include a public network such as a telephone network or the Internet, or alternatively network 138 may include a private network such as an intranet, or a combination of a public and a private network, although the scope of the invention is not limited in this respect.

Communication between user first device 110 and second device 120 and access point 140 may be implemented in accordance with one or more wireless standards including, for example, one or more wireless cellular standards, one or more wireless networking standards, one or more radio frequency identification (RFID) standards, and/or others. In at least one implementation, for example, the communication is implemented in accordance with the Bluetooth short-range wireless protocol (Specification of the Bluetooth System, Version 1.2, Bluetooth SIG, Inc., November 2003, and related specifications and protocols). Other possible wireless networking standards include, for example: IEEE 802.11 (ANSI/IEEE Std 802.11-1999 Edition and related standards like 802.11n), HIPERLAN 1, 2 and related standards developed by the European Telecommunications Standards Institute (ETSI) Broadband Radio Access Networks (BRAN), HomeRF (HomeRF Specification, Revision 2.01, The HomeRF Technical Committee, July, 2002 and related specifications), Ultrawideband, and/or others.

In accordance with one embodiment of the invention, access point 140 may be a multimode access point (MAP) in that access point 140 may allow first device 110 and second device 120 to communicate with access point 140 even though first device 110 and second device 120 may not be capable of communicating with one another, for example where first device 110 is arranged to communicate using a first wireless standard, such as the IEEE 802.11b/g standards, and where second device 120 is arranged to communicate using a second wireless standard, such as a higher throughput wireless communication standard directed toward, for example, operation at or near the 5 GHz frequency of the IEEE 802.11a standard, although the scope of the invention is not limited in this respect.

In one embodiment, WLAN system 100 includes multiple devices capable of communicating with first device 110 and access point 140. WLAN system 100 may include multiple other devices capable of communicating with second device 120 and access point 140. The multiple devices capable of communicating with first device 110 may all communicate using a first wireless standard, such as the IEEE 802.11b/g standards. The multiple other devices capable of communicating with second device 120 may all communicate using a second wireless standard such as a higher throughput wireless communication standard directed toward, for example, operation at or near the 5 GHz frequency of the IEEE 802.11a standard, although the scope of the invention is not limited in this respect.

In accordance with one embodiment, access to the medium is controlled by a media access control (MAC) sublayer of the Data Link Layer as described in a wireless standard. In particular, MAC operations control which devices, AP 140, first device 110 and/or second device 120, can initiate communications over the medium.

In one embodiment, first device 110, second device 120, and access point 140 may be arranged to communicate over an identical or similar frequency band, for example near 5 GHz, wherein the transceivers 112, 122, and 142 of first device 110, second device 120, and access point 140, respectively, are arranged to operate on a compatible physical layer, although the scope of the invention is not limited in this respect.

In one embodiment, first device 110 may be a legacy device, operating according to an older wireless standard and second device may be a newly developed device, operating according to a newly developed or newer standard. According to the newer standard, second device 120 may be required to receive and process communications according to the older, legacy standard. In such embodiments, first device 110 may not be able to receive and honor communications according to the newer standard, for example, a new format wireless medium reservation made by access point 140, or may not receive or process medium reservation packets sent by second device 120, although the scope of the invention is not limited in this respect. Additionally, second device 120 may be able to receive and honor communications according to the older standard, for example, an old format wireless medium reservation made by access point 140, and may receive or process medium reservation packets sent by first device 110, although the scope of the invention is not limited in this respect.

Because first device 110 cannot process communications from second device 120, protection mechanisms may be used to prevent first device 110 and second device 120 from initiating communications that may collide with communications of the other device. In one embodiment, access point 140 may allow both first device 110 and second device 120 to operate with access point 140 and with their peers without requiring a modification to the protocol under which the devices operate, although the scope of the invention is not limited in this respect.

To implement 40 MHz channel switching, for example in the WLAN system 100 described with respect to FIG. 1, an Extension Channel information element and a Channel Switch Announcement frame may be utilized. In one embodiment, the Extension Channel information element may include offset information corresponding to an extension channel. The Channel Switch Announcement frame may include the Extension Channel information element. A base station, such as AP 140 of FIG. 1, that receives the Channel Switch Announcement may determine control and extension channels in a 40 MHz channel.

In general, a wireless communication may be classified as Independent Basic Service Set (IBSS) or the Basic Service Set (BSS). The IBSS is those wireless networks in which an AP may help identify the remote clients. The BSS is those wireless networks of an ad hoc nature in which no APs are provided. A 40/20 MHz capable BSS/iBSS device is one that may support a 20-MHz extension channel and a 20-MHz control channel in a single 40-MHz channel.

In one embodiment, a New Extension Channel Offset element may be utilized by an AP in a BSS or a mobile station (STA) in an IBSS together with a Channel Switch Announcement element when changing to a new (e.g., 40 MHz) channel. One embodiment of a New Extension Channel Offset element is illustrated in FIG. 2. In one embodiment, each field 210, 220, 230 illustrated in FIG. 2 is an octet; however, any field size may be supported.

In one embodiment, the New Extension Channel offset field 230 may indicate the position of the extension channel relative to the control channel. For example, a value of "1" may indicate that the extension channel is above the control channel, a value of "2" may indicate that the extension channel is below the control channel, and a value of "0" may indicate that no extension channel is present. Alternate indications may also be used. In one embodiment, the New Extension Channel Offset element 200 may be included in a Channel Switch Announcement frame and also may be included in Beacon frames and Probe Response frames.

Layers within a wireless communication architecture communicate with each other via service primitives having, but not limited to, the following forms:

(1) Request A layer uses this type of primitive to request that another layer perform a specific service of scheduling a channel switch and announce this switch to peer entities in the BSS;

(2) Indication A layer uses this type of primitive to indicate to another layer that a significant event has occurred. This primitive indicates that a channel switch announcement has been received from a peer entity; and (3) Response A layer uses this type of primitive to complete a procedure initiated by an indication primitive. This primitive is used to schedule an accepted channel switch.

Particularly, in embodiments of the present invention, such primitives may be utilized when implementing 40 MHz channel switching.

FIG. 3 is a conceptual illustration of one embodiment of a channel switch request primitive 300. In one embodiment, the channel switch request 300 is a primitive used for requesting a 40 MHz channel switch. Channel switch request primitive 300 may include mode 310, channel number 320, new extension channel offset 330, and channel switch count fields 340.

The channel switch request primitive 300 is generated by a system management entity (SME) to schedule a channel switch and announce this switch to peer entities in the IBBS/BBS. Mode 310 is defined in a Channel Switch Announcement element. Channel Number 320 is the new channel number being switched to. New Extension Channel Offset 330 is the same as New Extension Channel Offset element 230 of FIG. 2. This parameter provides the position of the extension channel in relation to the control element. In one embodiment, a 40/20 MHz capable BSS/IBSS device may insert the New Extension Channel Offset parameter 330 into channel switch request 300. Channel Switch Count 340 identifies the number of Target Beacon Transmission Time (TBTTs) until the channel switch event as described by the Channel Switch Announcement element.

Figure 4:
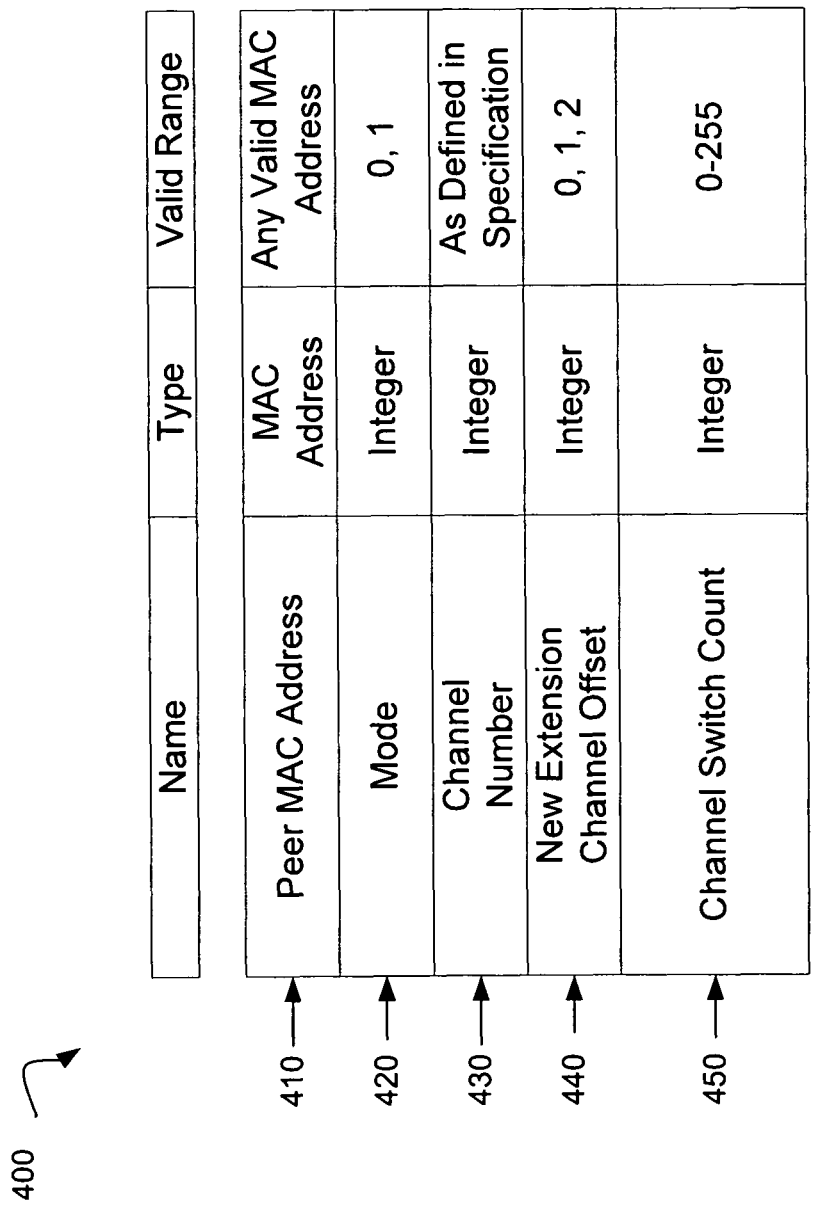
FIG. 4 is a conceptual illustration of one embodiment of a channel switch indication primitive.

FIG. 4 is a conceptual illustration of one embodiment of a channel switch indication primitive 400. In one embodiment, the channel switch indication primitive 400 is a primitive used for indicating that a 40 MHz channel switch announcement has been received from a peer entity. Channel switch indication primitive 400 may include peer MAC address 410, mode 420, channel number 430, new extension channel offset 430, and channel switch count field 450.

Peer MAC address 410 identifies the address of a peer MAC from which a channel switch frame is received. Mode 420 identifies the mode as defined in the Channel Switch Announcement element. Channel number 430 indicates the new channel number. New Extension Channel Offset 440 is the same as New Extension Channel Offset element 230 of FIG. 2. This parameter provides the position of the extension channel in relation to the control element. In one embodiment, a 40/20 MHz capable BSS/IBSS device may insert the New Extension Channel Offset parameter 440 into channel switch request 400. Channel Switch Count 450 identifies the number of TBTTs until the channel switch event as described by the Channel Switch Announcement element.

FIG. 5 is a conceptual illustration of one embodiment of a channel switch response primitive 500. In one embodiment, the channel switch response primitive 500 is a primitive used for completing a 40 MHz channel switch procedure initiated by an indication primitive, such as indication primitive 400 described with respect to FIG. 4. Channel switch response primitive 500 may include mode 510, channel number 520, new extension channel offset 530, and channel switch count field 540.

Mode 510 identifies the mode as defined in the Channel Switch Announcement element. Channel number 520 indicates the new channel number. New Extension Channel Offset 530 is the same as New Extension Channel Offset element 200 of FIG. 2. This parameter provides the position of the extension channel in relation to the control element. In one embodiment, a 40/20 MHz capable BSS/IBSS device may insert the New Extension Channel Offset parameter 530 into channel switch request 500. Channel Switch Count 540 identifies the number of TBTIs until the channel switch event as described by the Channel Switch Announcement element.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    transmitting a channel switch announcement frame to announce a channel switch for a 40 MHz channel of a wireless communications network, the channel including a 20 MHz primary channel and a 20 MHz secondary channel, the channel switch announcement frame including a channel switch announcement element and channel offset element;
    wherein the channel switch announcement element contains a channel number field, the channel number field indicating a number of the channel being switched to;
    wherein the channel offset element includes an element ID field, a length field and channel offset field, the channel offset field indicating a first value or a second value when a 20 MHz secondary channel is included in the channel of wireless communications network, the first and second values each indicating a position of the 20 MHz secondary channel relative to the 20 MHz primary channel; and wherein the channel offset field indicates a third value when no 20 MHz secondary channel is included in the 40 MHz channel of the wireless communications network.

2. The method of claim 1, wherein the first value indicates the secondary channel is at a frequency above the primary channel, and wherein the second value indicates the secondary channel is at a frequency below the primary channel.

3. The method of claim 2, wherein the first value is equal to one and the third value is equal to zero.

4. The method of claim 1, wherein the element ID field, the length field and the channel offset field are each an octet.

5. The method of claim 1, wherein the channel of the wireless communications network corresponds to an IEEE 802.11 basic service set (BSS) or an IEEE 802.11 independent basic service set (IBSS).

6. A device comprising:
a memory;
a baseband processor;
a Media-Access Control (MAC) layer;
one or more antennas;
a transceiver coupled to the antenna and to the baseband processor;
transmit circuitry to transmit a channel switch announcement frame to announce a channel switch for a 40 MHz channel of a wireless communications network, the channel including a 20 MHz primary channel and a 20 MHz secondary channel, the channel switch announcement frame including a channel switch announcement element and channel offset element;
wherein the channel switch announcement element contains a channel number field, the channel number field indicating a number of the channel being switched to;
wherein the channel offset element includes an element ID field, a length field and channel offset field, the channel offset field indicating a first value or a second value when a 20 MHz secondary channel is included in the channel of wireless communications network, the first and second values each indicating a position of the 20 MHz secondary channel relative to the 20 MHz primary channel; and
wherein the channel offset field indicates a third value when no 20 MHz secondary channel is included in the 40 MHz channel of the wireless communications network.

7. The device of claim 6, wherein the first value indicates the 20 MHz secondary channel is at a frequency above the 20 MHz primary channel, and wherein the second value indicates the 20 MHz secondary channel is at a frequency below the 20 MHz primary channel.

8. The device of claim 7, wherein the first value is equal to one and the third value is equal to zero.

9. The device of claim 6, wherein the element ID field, the length field and the channel offset field are each an octet.

10. The device of claim 6, wherein the channel of the wireless communications network corresponds to an IEEE 802.11 basic service set (BSS) or an IEEE 802.11 independent basic service set (IBSS).

11. A device comprising:
a transceiver;
transmit circuitry to transmit a channel switch announcement frame to announce a channel switch for a 40 MHz channel of a wireless communications network, the channel including a 20 MHz primary channel and a 20 MHz secondary channel, the channel switch announcement frame including a channel switch announcement element and channel offset element;
wherein the channel switch announcement element contains a channel number field, the channel number field indicating a number of the channel being switched to;
wherein the channel offset element includes an element ID field, a length field and channel offset field, the channel offset field indicating a first value or a second value when a 20 MHz secondary channel is included in the channel of wireless communications network, the first and second values each indicating a position of the 20 MHz secondary channel relative to the 20 MHz primary channel; and
wherein the channel offset field indicates a third value when no 20 MHz secondary channel is included in the 40 MHz channel of the wireless communications network.

12. The device of claim 11, wherein the first value indicates the 20 MHz secondary channel is at a frequency above the 20 MHz primary channel, and wherein the second value indicates the 20 MHz secondary channel is at a frequency below the 20 MHz primary channel.

13. The device of claim 12, wherein the first value is equal to one and the third value is equal to zero.

14. The device of claim 11, wherein the element ID field, the length field and the channel offset field are each an octet.

15. The device of claim 11, wherein the channel of the wireless communications network corresponds to an IEEE 802.11 basic service set (BSS) or an IEEE 802.11 independent basic service set (IBSS).

* * * * *